C. A. G. PFANNE.
MACHINE FOR TOOLING LITHOGRAPHIC SURFACES.
APPLICATION FILED MAY 10, 1912.

1,052,011.

Patented Feb. 4, 1913.

WITNESSES
Geo Schwarz.
Ida G. Gilmore.

INVENTOR
Carl A. G. Pfanne
BY Nicholas M. Goodlett Jr.
his ATTORNEY

C. A. G. PFANNE.
MACHINE FOR TOOLING LITHOGRAPHIC SURFACES.
APPLICATION FILED MAY 10, 1912.

1,052,011.

Patented Feb. 4, 1913.
8 SHEETS—SHEET 2.

WITNESSES

INVENTOR
Carl A. G. Pfanne
BY Nicholas M. Goodlett Jr.
his ATTORNEY

C. A. G. PFANNE.
MACHINE FOR TOOLING LITHOGRAPHIC SURFACES.
APPLICATION FILED MAY 10, 1912.

1,052,011.

Patented Feb. 4, 1913.

C. A. G. PFANNE.
MACHINE FOR TOOLING LITHOGRAPHIC SURFACES.
APPLICATION FILED MAY 10, 1912.

1,052,011.

Patented Feb. 4, 1913.

WITNESSES
Geo. Schwartz
Odie G. Gilmore

INVENTOR
Carl A. G. Pfanne
BY
Nicholas M. Goodlett
his ATTORNEY

C. A. G. PFANNE.
MACHINE FOR TOOLING LITHOGRAPHIC SURFACES.
APPLICATION FILED MAY 10, 1912.

1,052,011.

Patented Feb. 4, 1913.

WITNESSES

INVENTOR
BY
ATTORNEY

UNITED STATES PATENT OFFICE.

CARL A. G. PFANNE, OF HOBOKEN, NEW JERSEY.

MACHINE FOR TOOLING LITHOGRAPHIC SURFACES.

1,052,011.

Specification of Letters Patent.   Patented Feb. 4, 1913.

Application filed May 10, 1912. Serial No. 696,540.

*To all whom it may concern:*

Be it known that I, CARL A. G. PFANNE, a citizen of the United States, and a resident of Hoboken, county of Hudson, and State of New Jersey, have invented an Improved Machine for Tooling Lithographic Surfaces, of which the following is a specification.

This invention relates to an improved machine for tooling lithographic surfaces, whether such surfaces be of stone, zinc, aluminum or other character.

The invention seeks to provide a machine whereby the required "grain" may be formed on such surfaces and whereby a pattern previously developed on the surface may be removed before graining it, and whereby the operation may be conducted with increased convenience, despatch and accuracy.

The invention consists of the various features and combinations thereof hereinafter pointed out.

The drawings forming part of this specification, and wherein like reference numerals designate corresponding parts in the several figures, show the invention in one of its various embodiments, this being the form preferred.

Fig. 17 is a plan view, partly in section, of part of the bed plate.

Referring now more particularly to the drawings, A is the main frame of the machine having on one side a flat track rail 1 and on the other side the V-shaped track rail 2 extending throughout the length of the main frame.

3 and 4 are two racks bolted to the sides of the main frame and extending from end to end thereof. Traveling on the track rails 1 and 2 are two separately movable carriages B and C. The carriage B carries the grainers and the carriage C carries the cutters for operating upon the stone 7. This stone rests upon a bed plate 8 carried by the bed frame 9. The bed plate 8 rests upon balls 10 which are supported on the bed frame 9 and held in place by a rectangular frame 11 provided with perforations to receive the balls. Provision is made for imparting movement to the bed plate 8 in its own plane. Such movement is preferably of an oscillatory or gyratory character. For this purpose the bed frame is provided with two vertical shafts 12 and 13, centrally located at the front and rear, on the lower ends of which are fixed beveled gear wheels 14 and 15 meshing with corresponding beveled gear wheels 16 and 17 fixed to the shaft 18. This shaft is supported in brackets 31 and 32 projecting from the bed frame and is driven by suitable means such as the sprocket chain 19 geared to the main driving shaft 20 which is driven by the belt pulley 21. The upper ends of the shafts 12 and 13 are provided with eccentrics 22 and 23. The eccentric 22 works in a bushing 24 which fits tight in a recess on the under side of the bed plate 8. The eccentric 23 works in a rectangular box 25 which fits in a rectangular elongated recess 26 formed in the lower side of the bed plate. This box 25 does not fit tight in its recess but provides for and permits a forward and backward movement of the bed plate in response to the action of the eccentric 22. The eccentrics 22 and 23 are set at right angles to each other. Thus, when the shaft 18 rotates, the bed plate is given an oscillatory or gyratory movement due to the eccentrics 22 and 23. The stone 7 rests on teeth 28 fixed to the upper surface of the bed plate and is held in place by two front clamps 29 and two rear clamps 30.

The carriages B and C and the parts carried thereby are duplicates of each other except that the former carries graining tools and the latter carries the cutting tools and with the further exception that the sand box and rotary brush associated with the carriage B is omitted from the carriage C, and with the further exception that the carriage C is provided with a pneumatic cleaner. Similar reference numerals are applied to both.

Referring now to the carriage B, 33 is a rectangular carriage frame provided with two rear legs 34 and 35 and two front legs 36 and 37 to support the main weight of the carriage. The rear legs carry the wheels 38 and 39 and the front legs carry the wheels 40 and 41. The wheels 38 and 40 have flat peripheries to travel on the flat track rail 1. The wheels 39 and 41 have V-shaped peripheries to travel on the V-shaped track rail 2. Secured to the axle 42 of wheel 38 is a gear wheel 43 traveling on the rack 3. Secured to the axle 44 of wheel 39 is a gear wheel 45 which travels on the rack 4.

In the corners of the frame 33 are the vertical threaded holes 46, 47, 48 and 49 which, respectively, receive the adjusting screws 50, 51, 52 and 53. The upper ends of these screws are smooth and turn in recesses formed on the under side of and at the ends of two track bars 5 and 6. These track bars are held in fixed position by the adjusting screws. Fixed on these four vertical screws are worm wheels 55, 56, 57 and 58. Worm wheels 55 and 57 mesh with a worm shaft 59 carried by brackets 60 and 61 secured to the track rails 5 and 6. Worm wheels 56 and 58 mesh with worm shaft 62 carried in brackets secured to the opposite ends of the track rails 5 and 6. Worm shafts 59 and 62 are provided with beveled gears 63 and 64 which mesh with the beveled gears 65 and 66 fixed on the shaft 67 which is supported by brackets projecting from track rail 5. On the shaft 67 is a graduated hand wheel 68 associated with which is a pointer 69 carried by one of the brackets of shaft 67. A movement of the graduated wheel 68 rotates the worm shafts 59 and 62 thereby rotating the screws 50, 51, 52 and 53 and giving them an up or down movement. This elevates or lowers track rails 5 and 6 for the purpose of adjusting them and the parts they carry vertically with reference to the stone 7.

Figure 18:
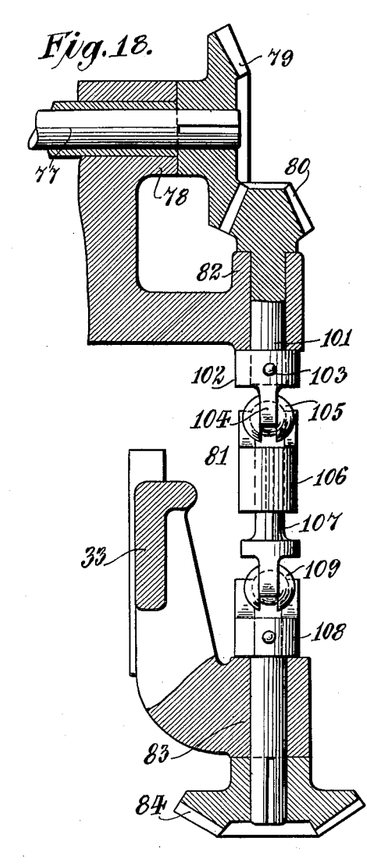
Fig. 18 is a sectional elevation of the flexible driving connection for a tool-carriage.

Supported by the track rails 5 and 6 is a rectangular plate 70 arranged to have a slight lateral movement to and fro on track rails 5 and 6. To make this movement easy and without undue friction, track rails 5 and 6 are provided on their upper sides with V-shaped track-ways 71 to receive ball bearings 72. The under side of the plate 70 is provided with similar V-shaped track-ways to register with the ball bearings 72. The plate 70 is provided with a central hub 73 in which turns the vertical shaft 74 the upper end of which is provided with a gear wheel 75 meshing with a gear 76 fixed on the shaft 77 which turns in a bearing 78 fixed on the plate 70. On the outer end of this shaft 77 is a beveled gear 79 meshing with a beveled gear 80 carried on the upper end of an extensible flexible shaft 81, (see Fig. 18), having universal joints. This shaft 81 is carried in an upper bearing 82 extending from the bearing 78 and in a lower bearing 83 carried by the frame 33. Fixed on the lower end of shaft 81 is a beveled gear wheel 84 which meshes with a gear 85 carried on the main shaft 20. On the lower end of the shaft 74 and integral therewith is a circular casting 86 provided around its periphery with bearing sleeves 87 and 88.

The bearings 87 support shafts 89 and the bearings 88 support shafts 90. The upper ends of the bearings 87 and their shafts 89 terminate in a plane slightly below the upper end of the bearings 88 and their shafts 90. The shafts 89 have fixed to their upper ends the gear wheels 91 and the shafts 90 have fixed to their upper ends the gear wheels 92. Secured to the plate or casting 70 is a circular rack 93 arranged to mesh with the gears 91 but to be clear of the gears 92, the shafts of the gears 92 being made long enough to maintain such gears above the level of the rack 93. The gears 91 and 92 are in mesh with each other. Thus, when the shaft 74 is driven by the train of gearing already described it carries with it the casting 86, and with this casting revolves the shafts 89 and 90 and their gear wheels 91 and 92 about the rack 93, thereby rotating the shafts 89 and 90 as they travel in their circular path about the rack 93. Secured to each of the shafts 89 and 90 is an abrading or graining tool comprising a steel plate 94 having four wings. By forming these plates 94 with wings, they may be brought nearer together without interfering with each other in their rotary movement. The shaft 74 and its casting 86 constitute a tool-carrier.

96 is a ball bearing for the shaft 74. On the lower side of the gear 75 is formed an eccentric 97 encircled by an eccentric strap 98 having an arm 99 pivoted on a crossbar 100 secured to the track bars 5 and 6. By this arrangement when the shaft 74 and the gear 75 are rotated the eccentric 97 and eccentric strap 98 impart a slight lateral movement to the casting 70 and the tool-carrier, the casting 70 traveling to and fro on the ball bearings 72. This lateral movement does not interfere with the proper working of the train of driving gears from the gear wheel 75 to the main shaft 20 because the shaft 77 and its gears and also the bearing 82 of gear 80 are supported by and move laterally with the casting 70, and the shaft 81, which carries the gear wheel 80, is made flexible by its universal joints. This shaft 81 is shown in detail in Fig. 18. Integral with the gear 80 is a short section of shaft 101 which fits in a recess of the clutch piece 102 and is held there by a pin 103. The lower side of the piece 102 is provided with two clutch fingers 104 which partly surround a ball 105, fitting in a groove in the ball. 106 is a companion clutch piece similar to the piece 102 and also fitting in a groove in the ball at right angles to the other groove. It is centrally bored to receive the shank, having a key, of the clutch piece 107 which is connected with the clutch piece 108 by the ball 109. The piece 108 is made fast to the shaft of gear 84 by a pin similar to pin 103.

The carriages B and C are arranged to be driven lengthwise of the frame of the machine so as to be brought into and out of operative position with reference to the stone 7. In the mechanism for this purpose as shown in the drawings, the main shaft 20 is provided with a groove 110 extending from end to end thereof. Carried on this shaft is a worm 111, having a key to fit said groove, and adapted to slide on the shaft and turn therewith. This worm is located between the two arms or forks 112 and 113 which surround the shaft and form a part of the bracket 114 fixed on the side of the frame 33. The worm 111 meshes with the worm wheel 115 carried on the shaft 44. This worm wheel is loose on its shaft but is provided with a clutch whereby it may be locked thereon. When so locked, the rotation of the main shaft 20 and the worm 111 rotates the worm wheel 115, thereby rotating the shaft 44 and with it the gear wheel 45. Gear wheels 45 and 43 are respectively in mesh with gears 130 and 129 secured on cross shaft 127 which is carried in brackets on the rear of frame 33. Thus, the rotation of shaft 44 turns the gear wheels 45 and 43 and causes them to travel on racks 4 and 3 to propel the carriage. In this movement the carriage is maintained in proper position during its movement by the V-shaped rail 2 and the corresponding wheels 39 and 41. As the carriage travels, the bracket 114 causes the worm 111 to slide with it on the main shaft, thereby keeping the worm in gear with the worm wheel 115. This worm wheel 115 may be disconnected from the shaft 44 by operating the clutch lever 116 which is pivoted at its lower end between extensions of the forks 112 and 113. The clutch lever 116 is in engagement with the clutch member 117 which is keyed on the shaft 44 and is adapted to be moved into and out of clutching engagement with the worm 115 whose hub surrounds the hub of gear wheel 45 which is fast on the shaft 44. When the clutch members are separated by the lever 116, the worm wheel 115 runs free. When the clutch members are brought into engagement with each other by the operation of clutch lever 116, then the worm wheel 115 is locked on the shaft 44 so that the latter and its gear wheel 45 are rotated by the rotation of the driving shaft 20.

Gear 85 is keyed on the shaft 20 so as to turn therewith and be capable of sliding thereon in the same way as has been described with reference to the worm 111. This gear 85 has a collar 118 provided with a groove. This collar fits loosely on the sleeve 119 carried by the bracket 114 and surrounding the shaft 20. The gear 85 is arranged to be connected with and disconnected from the sleeve 119 by the fork 120 pivoted on said sleeve. When the fork is in engagement with the groove, the gear 85 is made to travel lengthwise on the shaft 20 with the carriage B, and the rotation of shaft 20 to propel the carriage simultaneously operates the tool-carrier through gears 85, 84, etc. By disconnecting the fork 120 from gear 85 and sliding this gear backward, the carriage may be propelled without operating the tool-carrier. It may be desirable to do this in running the carriage forward into operating position or in running it backward after its work has been finished. The carriage B is provided with a hopper 121 to contain sand which may be fed through the discharge pipe 122 on to the surface of the work to assist in the graining operation. The carriage B is also provided with a rotary brush 123 supported in bearings on brackets 124 and driven by a sprocket chain 125 from the wheel 41. This brush preferably consists of alternate sections of felt and bristles. The brush is adjustable in its brackets by means of the adjusting screws 126. In some cases it is desirable to disconnect the carriage from the main shaft 20 and to propel the carriage by hand. For this purpose the shaft 127 is provided with a crank 128. When the clutch lever 116 is thrown to disconnect the main shaft, the rotation of shaft 127 by means of crank 128 will propel the carriage.

Figures 1, 1A:
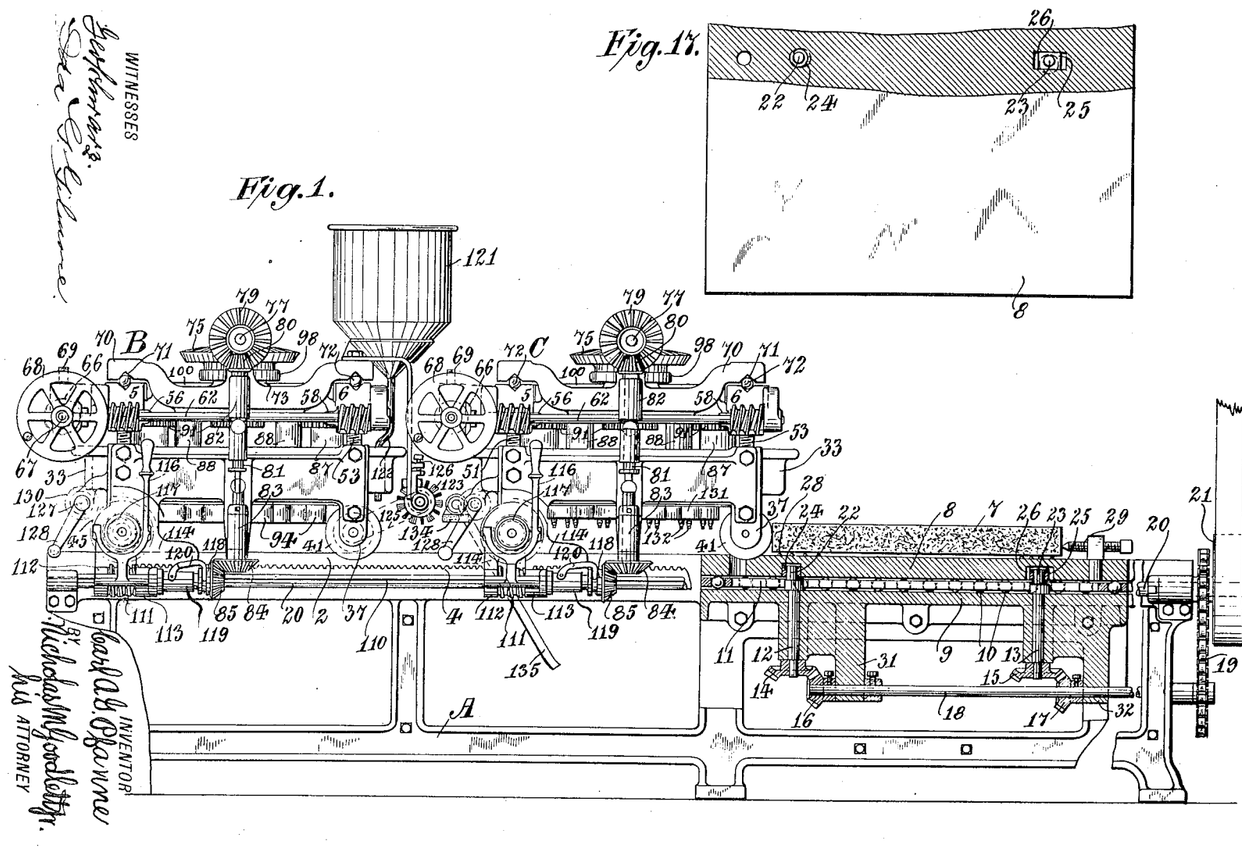
Figure 1 is a side elevation of the machine, the bed being shown in central vertical section.
Figure 2:
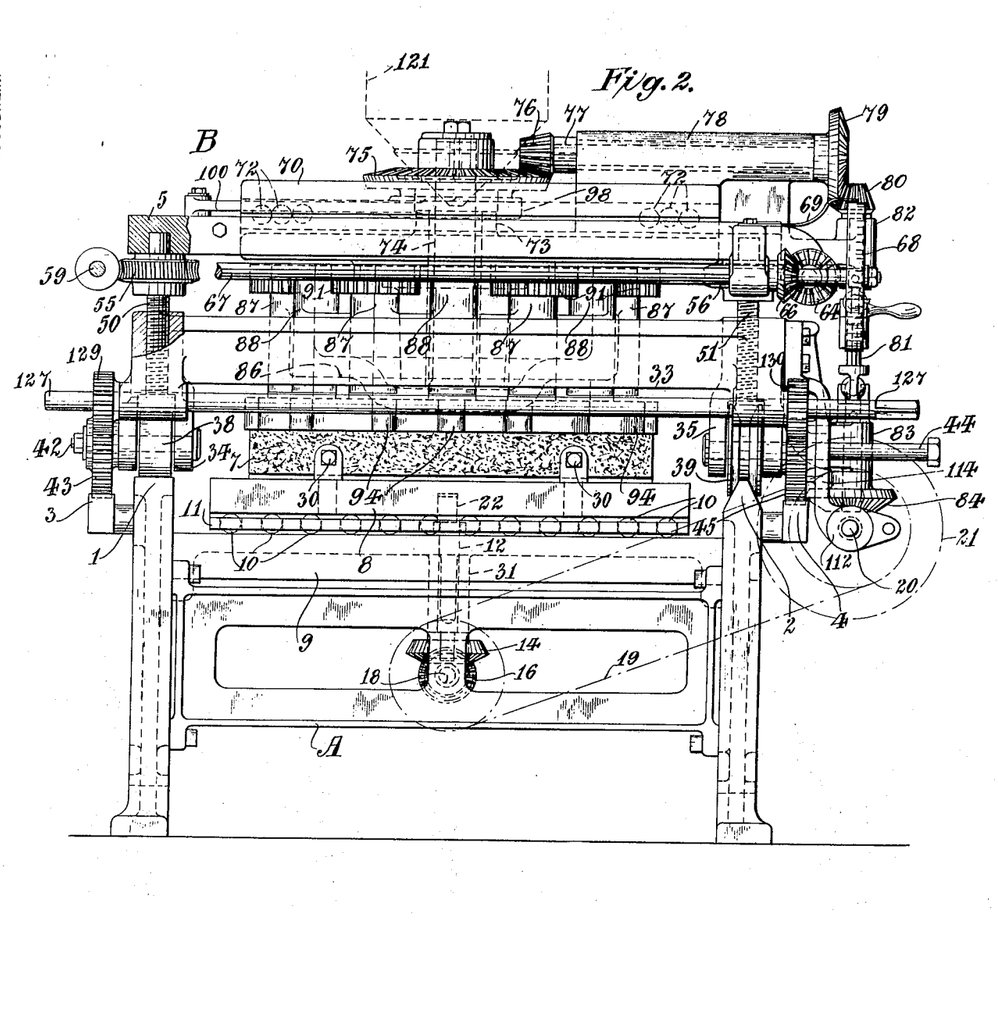
Fig. 2 is a front elevation looking toward the right of Fig. 1.
Figure 3:
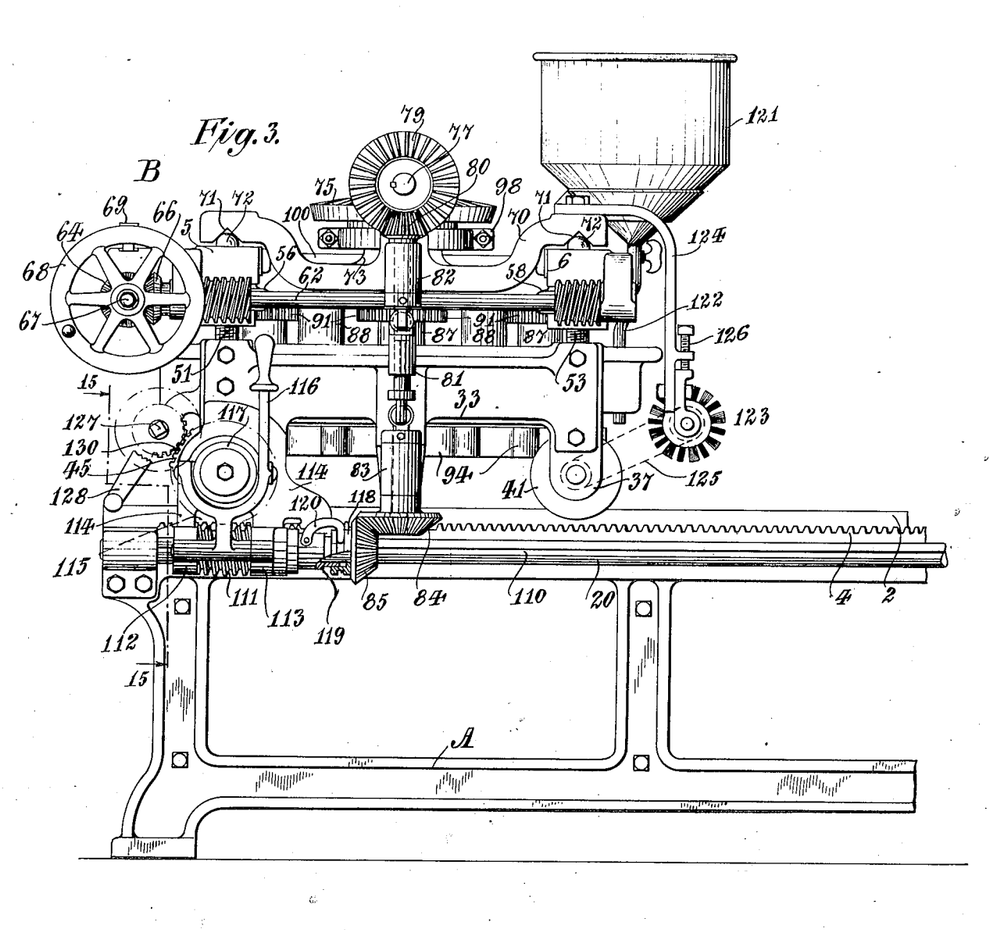
Fig. 3 is a side elevation of the rear carriage in its place on the frame of the machine.
Figure 4:
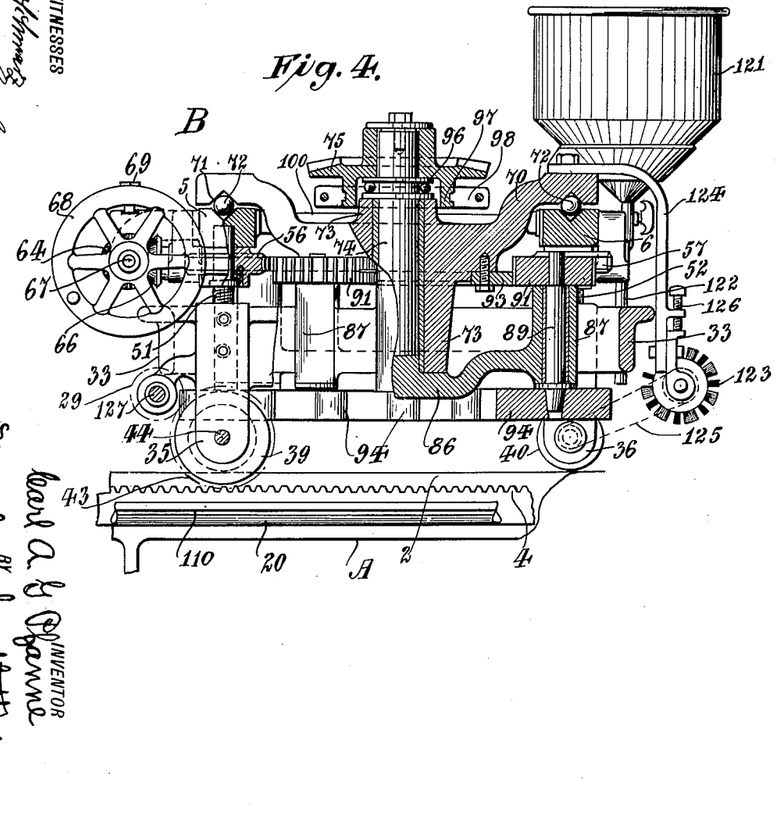
Fig. 4 is a side elevation, partly in central vertical section, of the rear carriage.
Figure 5:
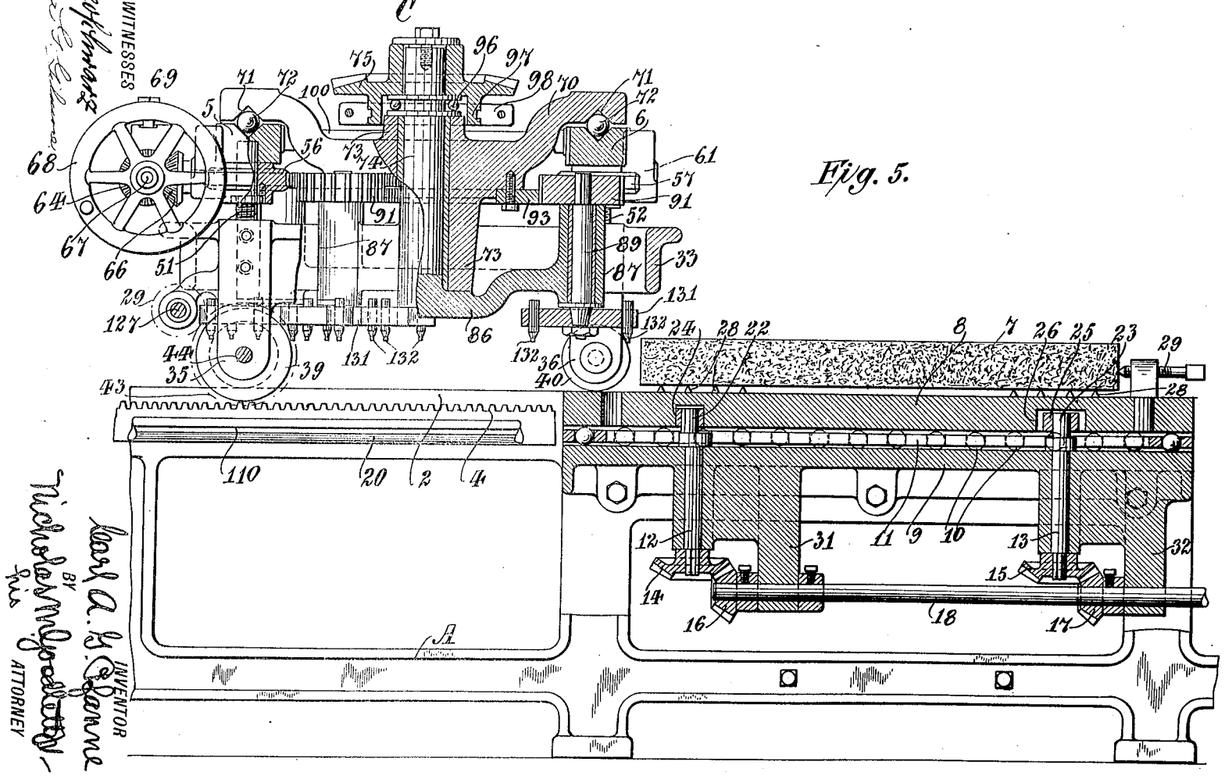
Fig. 5 is a side elevation of the front portion of the machine, the carriage being partly in central sectional elevation and the bed being in central sectional elevation.
Figure 6:
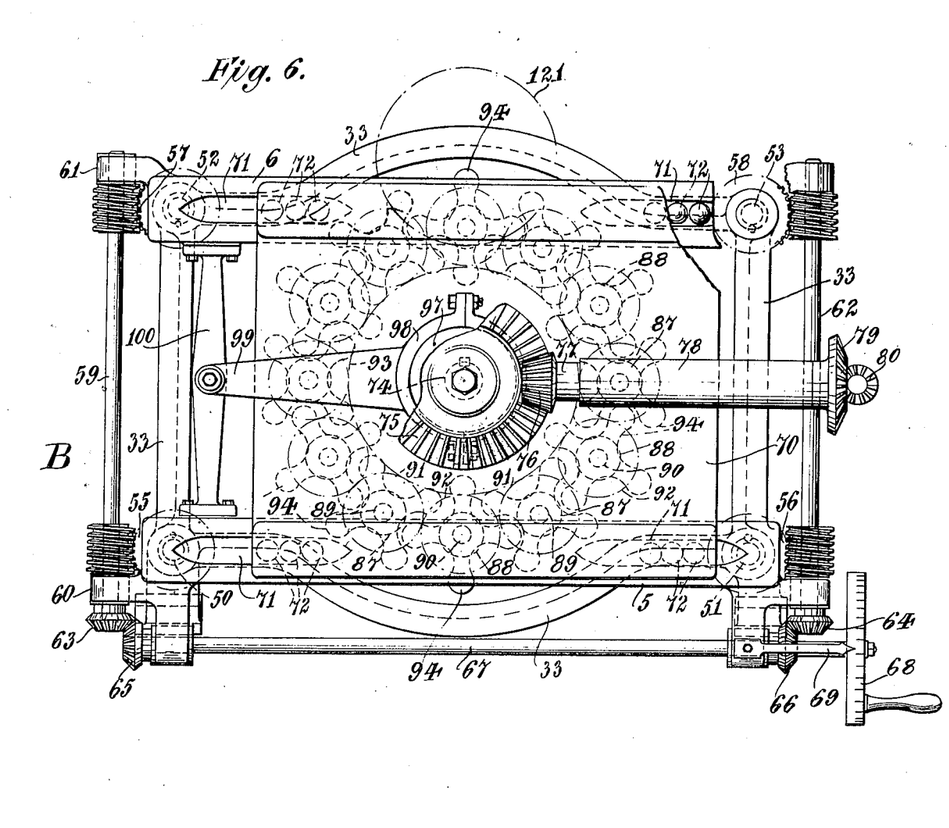
Fig. 6 is a plan view of the rear carriage and the parts carried thereby.
Figure 7:
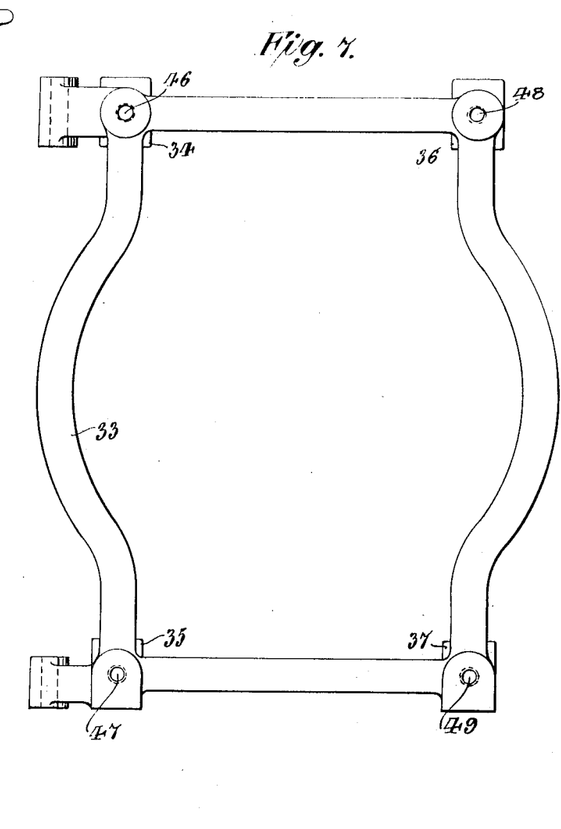
Fig. 7 is a plan view of the frame of one of the carriages.
Figures 8, 9:
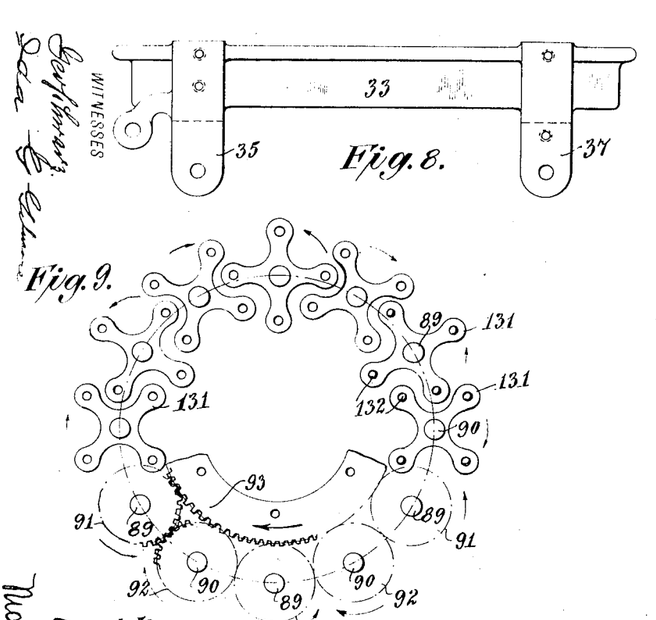
Fig. 8 is a side view of said frame.
Fig. 9 is a plan view showing the relation of the tools and the means for driving them.
Figure 10:
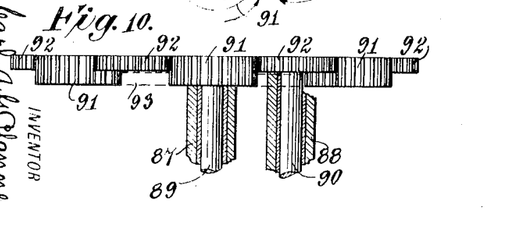
Fig. 10 is a side elevation of the gearing for the rotating tools.
Figures 11, 12, 13, 14, 15, 16:
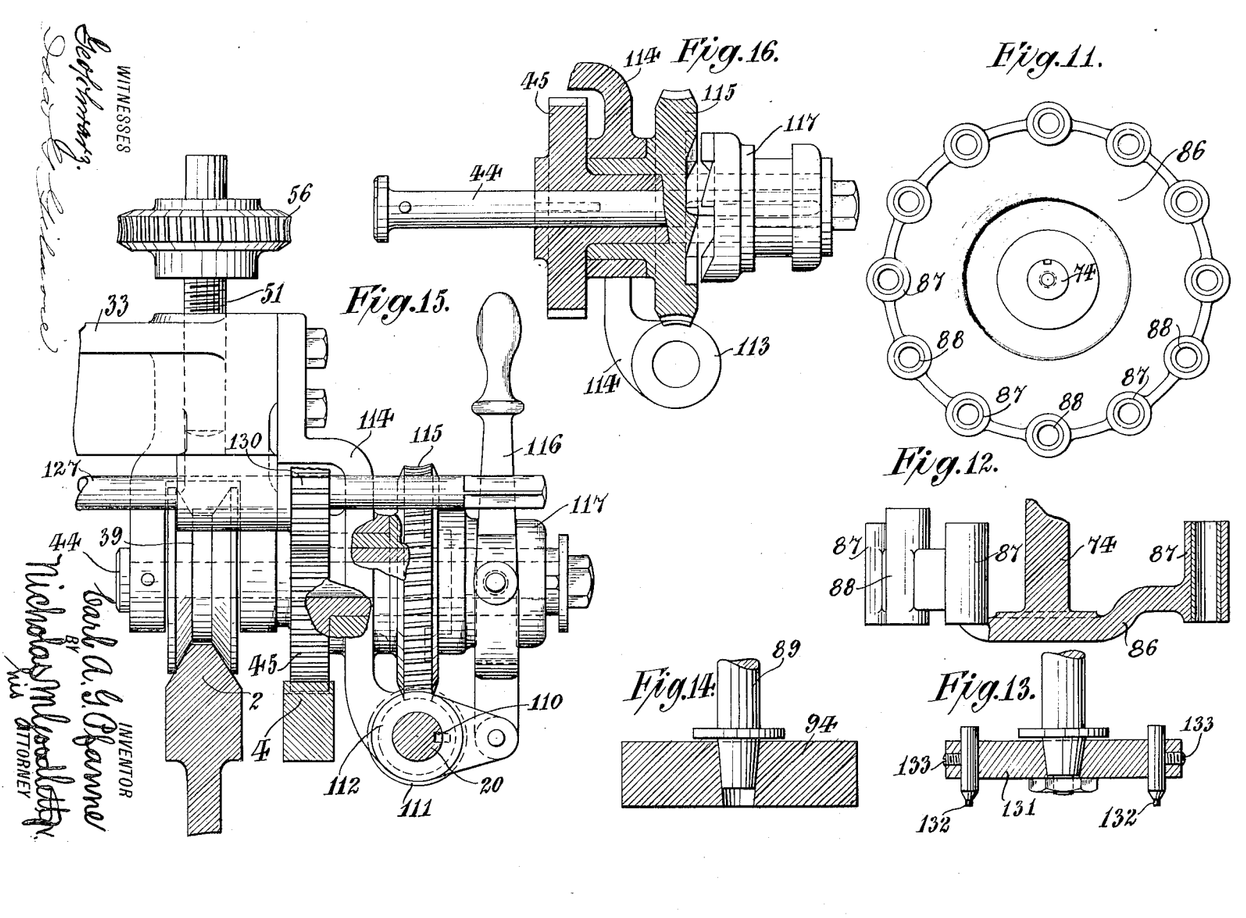
Fig. 11 is a plan view of the rotating tool-carrier.
Fig. 12 is a side elevation, partly in section, of said rotating tool-carrier.
Fig. 13 is a detail view, partly in section, of one of the grinders.
Fig. 14 is a similar view of one of the cutters.
Fig. 15 is a side elevation of the clutch mechanism and its associated parts, partly in section on line 15—15 of Fig. 3.
Fig. 16 is a side elevation partly in section of said clutch.

In the carriage C the operating tools are of somewhat different character from the tools or abrading plates 94 in carriage B. These abrading plates 94 operate to grain the lithographic surface. In carriage C the tools, as shown, are designed to grind or cut the surface for the purpose of leveling it and removing all traces of any pattern that may have been previously developed thereon. One of the tools for carriage C is shown in detail in Fig. 13. As there shown, the tool comprises a plate 131 similar in shape to the plate 94 but provided with cutting or abrading points 132 which may be made of carbon. They are adjustable in the plate 131 by means of screws 133.

In the operation of the machine, the carriage C may be run to a position over the stone and its tools applied with the required pressure upon the surface of the stone by adjustment of the hand wheel 68. The action of the tools is to cut into and remove as much of the stone as may be desired, the stone being ground to an exact level if not already in this condition. When found convenient, the driving wheels of the carriage may be disconnected from the shaft 20 and the carriage moved backward and forward over the stone or other surface by operating the crank 128. After the carriage C has done its work, it may be moved forward beyond the stone and the carriage B brought forward to perform its tooling operation, the frame of the machine being sufficiently long to permit the carriage C to be moved forward of and beyond the stone. The carriages B and C may be run backward to their initial position back of the stone by reversing the direction of the belt which operates the driving shaft 2. The carriage C may be provided with a pneumatic or suction cleaner 134 having a pipe connection 135 to a suitable pump. By this means, the material removed from the stone or other surface may be immediately carried away. The carriage B may be similarly provided if desired.

What is claimed and desired to be secured by Letters Patent is:—

1. In a machine for tooling lithographic surfaces, the combination of a main frame; a bed for the work; means for imparting movement to the bed in its own plane; a track-way on the main frame; and a tool-carriage on said track-way, provided with a rotating tool-carrier, and adapted to travel thereon into and out of operative relation with said bed, and means separate from the bed for rotating said tool-carrier.

2. In a machine for tooling lithographic surfaces, the combination of a main frame; a bed for the work; means for imparting movement to the bed in its own plane; a track-way on the main frame; and a tool-carriage on said track-way, provided with a rotating tool-carrier adjustable relative to the work, and adapted to travel thereon into and out of operative relation with said bed; and means separate from the bed for rotating said tool-carrier.

3. In a machine for tooling lithographic surfaces, the combination of a main frame; a bed for the work; a track-way on the main frame; and a tool-carriage on said track-way, provided with a rotating and oscillating tool-carrier adjustable relative to the work, and adapted to travel thereon into and out of operative relation with said bed.

4. In a machine for tooling lithographic surfaces, the combination of a main frame; a bed for the work; means for imparting movement to the bed in its own plane; a track-way on the main frame; and a vertically adjustable tool-carriage on said track-way, provided with a rotating tool-carrier having a plurality of rotating tools, and adapted to travel thereon into and out of operative relation with said bed, and means separate from the bed for rotating said tool-carrier.

5. In a machine for tooling lithographic surfaces, the combination of a main frame; a bed for the work; means for imparting movement to the bed in its own plane; a track-way on the main frame; and a tool-carriage on said track-way, provided with a rotating tool-carrier having a plurality of separately moving tools, and adapted to travel thereon into and out of operative relation with said bed; and means separate from the bed for rotating said tool-carrier.

6. In a machine for tooling lithographic surfaces, the combination of a main frame; a bed for the work; a track-way on the main frame; and a tool-carriage on said track-way adapted to travel thereon into and out of operative relation with said bed, said tool-carriage being provided with a rotating and oscillating tool-carrier having thereon a plurality of separately moving tools.

7. In a machine for tooling lithographic surfaces, the combination of a main frame; a bed for the work; a track-way on the main frame; a tool-carriage on said track-way adapted to travel thereon into and out of operative relation with said bed; a driving shaft extending lengthwise of the main frame and carried in bearings on said main frame; and means connecting said shaft and carriage and traveling with the carriage whereby the carriage may be propelled by the rotation of said shaft, said means including a gear member keyed to and sliding on the shaft, a coacting gear member carried on said carriage and a clutch for connecting and disconnecting said gear members.

8. In a machine for tooling lithographic surfaces, the combination of a main frame; a bed for the work; a track-way on the main frame; a tool-carriage on said track-way adapted to travel thereon into and out of operative relation with said bed; a rotating tool-carrier on the tool-carriage rack bars extending lengthwise of said frame; gear wheels carried by said carriage and engaging said rack bars; a driving shaft; means for connecting said shaft and gear wheels for propelling the carriage; and means for operatively connecting the tool-carrier with said shaft.

9. In a machine for tooling lithographic surfaces, the combination of a main frame; a bed for the work; a track-way on the main frame; a tool-carriage on said track-way adapted to travel thereon into and out of operative relation with said bed; a driving shaft extending parallel with said track-way; a driving gear carried on said shaft and arranged to turn with the shaft and slide with the carriage on the shaft; driving wheels on said carriage; and means connecting said driving wheels with said driving gear for propelling the carriage.

10. In a machine for tooling lithographic surfaces, the combination of a main frame; a bed for the work; a track-way on the main frame; a tool-carriage on said track-way adapted to travel thereon into and out of operative relation with said bed; a rotating tool-carrier on the tool-carriage; a driving shaft; means for operatively connecting said shaft and carriage to propel the carriage; and means for operatively connecting said shaft and tool-carrier for rotating the tool-carrier.

11. In a machine for tooling lithographic surfaces, the combination of a main frame; a bed for the work; a track-way on the main frame; a tool-carriage on said track-way adapted to travel thereon into and out of operative relation with said bed; a driving shaft extending parallel with said track-way and carried in bearings stationed on the main frame; a driving worm carried on said shaft and arranged to turn with the shaft and slide with the carriage on the shaft; a worm wheel on the carriage meshing with said worm; and a clutch on the carriage for connecting and disconnecting said worm and worm wheel.

12. In a machine for tooling lithographic surfaces, the combination of a main frame; a bed for the work; means for imparting movement to the bed in its own plane; a track-way on the main frame; a tool-carriage on said track-way, provided with a rotating tool-carrier, and adapted to travel thereon into and out of operative relation with said bed; a driving shaft carried in bearings stationed on the main frame; and gearing connecting said shaft and tool-carrier.

13. In a machine for tooling lithographic surfaces, the combination of a main frame; a bed for the work; a track-way on the main frame; a tool-carriage on said track-way adapted to travel thereon into and out of operative relation with said bed; a tool-carrier movable on the tool-carriage; a driving shaft extending parallel with said track-way and carried in bearings mounted on the main frame; a driving gear carried on said shaft and arranged to turn with the shaft and slide with the carriage on the shaft; driving wheels on said carriage; means connecting said driving wheels with said driving gear; and gearing connecting said shaft and tool-carrier.

14. In a machine for tooling surfaces, the combination of a tool-carriage provided with supporting wheels for the travel of the carriage; a tool-carrier supported by and having an operative movement independent of the movement of said tool-carriage; a shaft mounted in fixed bearings; and means for operating the tool-carrier from said shaft independent of the travel of the tool-carriage.

15. In a tool-carriage for tooling lithographic surfaces, the combination of a carriage main frame; a rotating tool-carrier supported by and within said main frame and having an upright shaft and a plurality of separate tools arranged to rotate in said tool-carrier; and means for oscillating said tool-carrier.

16. In a tool-carriage for tooling surfaces, the combination of a carriage main frame; a rotating tool-carrier supported by and within said main frame and having an upright shaft; a hub supporting said shaft and itself supported by and movable transversely with relation to the main frame; means for moving said hub and shaft transversely relative to said main frame; a circular rack carried by said hub; and a plurality of tool-shafts, having gears, carried by said tool-carrier and arranged to be driven from said circular rack when the tool-carrier is rotated.

17. In a tool-carriage for tooling lithographic surfaces, the combination of a carriage main frame; adjusting screws working in said main frame; track bars supported on and adjustable by said screws; a central hub supported on said track bars; a tool-carrier having an upright shaft rotatable in said hub; driving mechanism for said shaft; and an eccentric for oscillating said hub and shaft on said track bars when the shaft is rotated.

18. In a machine for tooling lithographic surfaces, the combination of a main frame; a bed for the work; a track-way on the main frame; a plurality of tool-carriages arranged to travel on said track-way and carrying tool-operating mechanism; a driving shaft carried in bearings mounted on the main frame; connections between each tool-carriage and the shaft for propelling said carriages separately; and connections between each tool-carrier and said shaft for independently operating said tool-carriers.

In testimony whereof, I have signed my name to this specification, in the presence of two subscribing witnesses.

CARL A. G. PFANNE.

Witnesses:
L. A. WATSON,
IDA G. GILMORE.